US005206050A

United States Patent [19]
Jennings

[11] Patent Number: 5,206,050
[45] Date of Patent: Apr. 27, 1993

[54] FOOD ANALOG AND PROCESS FOR MAKING THE SAME

[75] Inventor: Richard A. Jennings, Santa Fe, N. Mex.

[73] Assignee: Rudolph Holscher, Santa Fe, N. Mex.; a part interest

[21] Appl. No.: 649,432

[22] Filed: Feb. 1, 1991

[51] Int. Cl.⁵ .............................................. A23J 3/16
[52] U.S. Cl. .................................... 426/656; 426/634; 426/802; 426/574; 426/104
[58] Field of Search ............... 426/634, 802, 574, 104, 426/656

[56] References Cited

U.S. PATENT DOCUMENTS

| 3,852,484 | 12/1974 | Cabot | 426/802 |
|---|---|---|---|
| 3,870,808 | 3/1975 | Boyer et al. | 426/802 |
| 3,914,443 | 10/1975 | Sakita et al. | 426/574 |
| 4,147,811 | 4/1979 | Abe | 426/634 |
| 4,511,588 | 4/1985 | Kudo et al. | 426/634 |
| 4,579,749 | 4/1986 | Ishizuka et al. | 426/574 |
| 4,636,398 | 1/1987 | Matsuura | 426/634 |
| 4,645,681 | 2/1987 | Sugisawa et al. | 426/634 |
| 4,789,556 | 12/1988 | Okonogi et al. | 426/573 |
| 4,818,558 | 4/1989 | Hartman et al. | 426/634 |
| 4,943,441 | 7/1990 | McCabe | 426/802 |

FOREIGN PATENT DOCUMENTS

| 0180548 | 9/1985 | Japan | 426/802 |
|---|---|---|---|
| 1293363 | 12/1986 | Japan | 426/634 |
| 2126947 | 6/1987 | Japan | 426/634 |

*Primary Examiner*—Joseph Golian
*Attorney, Agent, or Firm*—Tarolli, Sundheim & Covell

[57] ABSTRACT

Disclosed is a novel process for producing a cooked food analog from soybeans. The process comprises obtaining soybean milk and adding a coagulant to the soybean milk, preferably while the soybean milk is at a temperature in the range of about 70°–90° C. (158°–194° F.) to form a mixture of soybean curds and whey. The mixture of curds and whey is broken to obtain curd differentiation. The curds are then cooked, at a temperature and for a time effective to form small pieces of curd. The supernatant liquid is separated from the curds, and the curds are rapidly cooled. The present invention provides a process for obtaining food analogs having a wide range of organoleptic properties, from a scrambled egg analog, wherein the curds are soft and relatively large, to a cooked meat analog, wherein the curds are harder and relatively small.

20 Claims, No Drawings

FOOD ANALOG AND PROCESS FOR MAKING THE SAME

BACKGROUND OF THE INVENTION

1. Technical Field

The present invention relates to a novel process for producing a cooked food analog from soybeans, and to the food analog produced thereby. The present invention is particularly applicable to the preparation of a cooked animal protein analog, such as a ground meat analog or a scrambled egg analog.

2. Description of the Prior Art

The production of tofu consists of two main steps; first, the preparation of soymilk; and, second, the coagulation of the soymilk to form curds which are then pressed to form tofu cakes.

U.S. Pat. No. 4,579,749 discloses a process for producing a ground meat analog from tofu. The process comprises the steps of extracting soymilk from soybeans, coagulating the soymilk to form curds and then pressing the curds to form tofu cakes. The tofu cakes have a solids content in the range of about 35%-50%. The tofu cakes are then shaped into a form like ground meat, for instance in a meat chopper, and heat treated, for instance in a steamer at 100° C. for 10-20 minutes. The patent indicates that the heat treated product has a hardness and chewiness similar to the hardness and chewiness of ground meat. The patent states, in column 3, lines 55, 56, that the "food produced by the method of the invention is fundamentally a pressed tofu".

U.S. Pat. No. 4,645,681 discloses a process for preparing tofu which comprises obtaining soybean milk, or an aqueous solution of isolated soybean protein, coagulating the milk to form curds, adding additional soybean milk to the curds, crushing the curds while in the presence of the soybean milk, adding additional coagulant to the crushed mixture of curds and soybean milk, and heating the same to further coagulate the mixture. The heating is carried out at about 85° C. for about 40 minutes in a heat-resistant plastic container which is sealed. The product obtained is described as having good texture and taste. The purpose of the process is to mechanize the traditional tofu making process by eliminating labor intensive and imprecise steps. The end product is intended to be as similar as possible to traditional tofu. There is no cooking of curds.

U.S. Pat. No. 4,636,398 discloses a process for making retort packed tofu which comprises soaking soybeans in water and leaching the soluble saccharides from the soybeans, grinding the soybeans in water to form a slurry, and then filtering the slurry to obtain soybean milk. The soybean milk is adjusted to a pH of about 4.5 precipitating protein which is separated from the milk, for instance by centrifuging. The milk is admixed with a coagulant, such as delta-glucone lactone, and introduced into a retort in which it is sealed and heated to effect both sterilization and coagulation. This provides a retort packed tofu. As in U.S. Pat. No. 4,645,681, the patent describes a process for mechanizing the traditional tofu making process. There is no cooking of the curds.

U.S. Pat. No. 4,789,556 discloses a process similar to that of U.S. Pat. No. 4,636,398. A soybean protein isolate, having a coagulation ability of at least 80, is added to soybean juice (soymilk). The soybean juice is then homogenized and sterilized. A coagulant is added to the soybean juice to form a mixture. This mixture is introduced into a container which is sealed and heated to obtain a packaged, aseptic curd having a firmness of at least 130, as measured by a curd tension meter. This process produces what can best be described as a "hard kinugoshi" tofu. The curds are not separated from the whey. There is no formation of distinct curds and no cooking of curds.

U.S. Pat. No. 4,511,588 discloses a process in which a coagulant is added to soybean milk. The pH of the soybean milk is adjusted to 6.5-7.5, and the soybean milk is then poured into heated oil at 75°-140° C. This produces a granular product having a surface coated with an oily film.

SUMMARY OF THE INVENTION

The present invention resides in a novel process for producing a cooked food analog from soybeans. The process comprises obtaining soybean milk, and adding a coagulant to the soybean milk to form a mixture of soybean curds and whey. The mixture of curds and whey is broken to obtain curd differentiation. The curds are cooked at a temperature and for a time effective to harden the curds and form small pieces of curd. The supernatant liquid is then poured off from the curds, and the curds are rapidly cooled.

Preferably, the cooking is performed with the curds in the whey. Preferably, the soybean milk is at a temperature in the range of 70°-85° C. (158°-185° F.) when the coagulant is added to the soybean milk, and the cooking is performed at a temperature of at least about 100° C. (212° F.).

Preferably, the cooling is performed by rinsing the curds in cold water.

In one embodiment of the present invention, the cooled curds define, without further processing, a useful end product. One such useful end product is a scrambled egg analog. The curds are egg flavored and colored during processing. The curd breaking and cooking steps are controlled to obtain a relatively large, soft curd similar to a scrambled egg.

Another such useful end product is a ground meat analog. The curds are meat flavored and colored during processing. The curd breaking and cooking steps are controlled to obtain a small, relatively harder curd similar to ground meat.

Alternatively, the curds may be further processed following cooling, for end use. One such further processing comprises mixing the curds with a binder and forming the curds into a patty, e.g., a meat analog patty.

In an embodiment of the present invention, the curds, either in discrete or patty form, are frozen.

The present invention also resides in novel food analogs made from the above processes.

DESCRIPTION OF PREFERRED EMBODIMENT

In the process of the present invention, soybean milk is used as a starting material. The soybean milk can be prepared by conventional procedures. For instance, whole soybeans, dehulled soybeans, or defatted soybeans can be washed and soaked, for instance up to about 8-12 hours for hulled soybeans, or 1-3 hours for dehulled soybeans. The soaking serves the additional function of leaching soluble saccharides from the soybeans to increase digestibility of the product. Preferably, the soaking is performed at room temperature, for instance about 21°-27° C. (70° to 80° F.), and at a pH of about 6.

After soaking, the soybeans are washed with water and drained. They are then ground or crushed in the presence of water. A typical grinding or crushing apparatus is a BMI hammermill with screen sizes from 0.020–0.050 inch. The amount of water present during the grinding or crushing step is preferably about 2 to about 6 times the weight of the soybeans. The grinding or crushing can be carried out at room temperature, but preferably is carried out in water heated to about 80° to 95° C. (176°–203° F.). The higher temperature helps deactivate lipoxidase during the grinding or crushing step.

The grinding or crushing step yields a slurry of soybean meal having a ratio of water to soybeans of about 10:1 by weight. The slurry is then cooked at 100°–110° C. (212°–230° F.) for about 2 to 6 minutes. Cooking is carried out in a steam kettle, heat exchanger, steam injected cooker having pressure capacity, or other suitable cooker. A defoamer can be added to the slurry during the cooking step. The cooking step should be performed soon after grinding or crushing, preferably less than 15 minutes. After cooking, the slurry is filtered to yield soybean milk. Filtering can be performed in a roller extractor or hydraulic press.

The soybean milk is then colored if desired with a GRAS water soluble food coloring. A list of typical colorants is listed below:

Williamson #602 Powdered Caramel Color 1000 ppm
Turmeric Frontier Seasonings #202
Kalsec #21-380-140-01 Vegetone extra yellow
Kalsec #12-100-24 Turmeric in glycerine
Kalsec #859301 Anatto in Glycerine Water soluble flavorants can also be added to the soybean milk at this point.

The soybean milk is normally at about 70° to about 90° C. (158°–194° F.) at this point, and is then coagulated (curded) by adding a coagulant to the milk. Seventy (70°) to 90° C. (158°–194° F.) is a preferred range. Below about 50° C. (122° F.), the forming of curds does not take place. Above about 95° C. (203° F.), the curds are too soft. The soybean milk can be heated if necessary so that it is within the above ranges. The soybean milk has a pH of about 5.9–6.3. No pH adjustment is required. A number of well known coagulants can be used. A preferred coagulant is calcium sulfate. Other divalent metal salts can be used such as calcium chloride, magnesium chloride, and magnesium sulfate. Another suitable coagulant is a delta-gluconic lactone (referred to as G.D.L.).

In the present invention, the curding can be performed in any conventional heating vessel. One suitable such vessel is a Groen steam jacketed kettle with a single motion mixer. The amount of coagulant is a coagulating amount. Generally, the amount is about 2%–3% based on the weight of the beans initially employed in the process, or about 0.15%–0.35% based on the weight of the soybean milk. The coagulation step produces a slurry of curds and whey, in which the curds comprise approximately 10% to about 25% by weight of the slurry. The slurry is somewhat in the form of a watery custard of coagulated protein dispersed in the whey. The whey is the continuous phase of the slurry.

In accordance with conventional practice, the curds would then be separated from the whey, at this point, for instance by removing supernatant liquid followed by pressing the curds in a filter press, for instance at about 0.05 to about 0.2 psi for about 15–20 minutes. This would form the tofu into a solid, relatively homogeneous block. It would then be cut into a desired shape, cooled in water, e.g., 5° C. for about 60–90 minutes, and then packaged and refrigerated, for instance at about 2°–4° C. Alternatively, the tofu could be packaged and pasteurized in the package by heating at about 71° C. (160° F.) for about one hour. Also, the tofu could be vacuum packed.

In accordance with the present invention, the mixture of curds and whey, following coagulation, is broken, for instance by running the single motion mixer, to break up the custard into pieces of curd and achieve a heterogeneity in the slurry of differentiated curds in the whey. The amount of mixing required is small. Only about 10 to 60 seconds of operation of the mixer is needed. This is a gentle mixing, only that necessary to break the curds and to achieve a uniform dispersion of separated curds in the whey. Breaking the curds can be carried out with a paddle. The size of the curds, in the curd largest dimension, may be about two inches.

At this point the curds are then subjected to cooking. Cooking causes the protein in the curds to denature. The curds shrink, toughen and become water insoluble. The cooking thus forms small pieces of curd. Cooking is performed at boiling temperature of at least about 100° C. (212° F.), and atmospheric pressure. The cooking preferably is carried out in the curding vessel. The vessel can have pressure capacity, so that the cooking can be performed at higher temperatures and pressures, if desired. Small increases in temperatures and pressures were not found to yield results essentially different from those obtained by cooking at atmospheric pressure and boiling temperature.

The length of time of cooking is dependent upon the end product desired. For an end product such as a scrambled egg analog, the length of time of cooking is the minimum amount possible, e.g., about 0.5–1 minute. More specifically, the procedure for preparing a scrambled egg analog comprises bringing the mixture of curds and whey up to boiling temperature (100° C./212° F.), while breaking the mixture of curds and whey during a portion of that time, and then, when the boiling temperature is reached, immediately cooling the mixture of curds and whey to below boiling temperature. Cooling is carried out so that the mixture of curds and whey remains at boiling temperature, about 100° C., for less than a minute, typically about 0.5 minutes. This produces a curd having an irregular shape, an average size, in the curd largest dimension, of about one to two inches, and a hardness less than about 6 kg., as determined on an Instrom Universal Testing Machine, preferably in the range of about 1.5 to about 5 kg.

Rapid cooling can be carried out in a number of ways. For instance, cold water can be introduced into the bottom of the cooking vessel displacing whey from the vessel, and cooling the curds. Also, cooling can be carried out by use of a heat exchanger.

For an end product like a cooked ground meat analog, the length of time of cooking is longer. The procedure for preparing a cooked ground meat analog comprises maintaining the mixture of curds and whey at boiling temperature (100° C./212° F.) for a period of time sufficient to further shrink and harden the curds. The criteria for the cooking time used is the size of the curd desired and the hardness of the curd. Generally, the time of cooking for a meat analog will be about 5–15 minutes to obtain a curd having a size, in the curd largest dimension, in the range of about 1/16 to about ¼ inch, and a hardness in the range of about 25 to 60 kg., as determined on an Instrom Universal Testing Machine, preferably in the range of about 30 to about 50 kg. In contrast to preparing an egg analog, agitation of the curds and whey preferably is maintained during cooking, in the preparation of a cooked ground meat analog. The agitation can be carried out in the same manner employed for breaking the curds.

In the preparation of a meat analog, a defoaming agent, such as vegetable oil, mixed with calcium carbonate, can be added to the slurry during the cooking step, but this is not necessary. Normally, the agitation alone will prevent excessive frothing of the whey.

Following cooking, the supernatant liquid (whey) from the boiling step is poured off. The pieces of curd are then quickly rinsed, for instance in tap water, to rapidly cool the pieces. The cooling is necessary to set the curd protein and prevent aggregation of the curds. The cooling should be sufficient to bring the curds to a temperature well below boiling temperature.

The pieces of curd can then be further flavored and colored if desired. Flavoring and further coloring at this point may not be desired in connection with a cooked end product such as a scrambled egg analog, wherein sufficient flavoring and coloring can be infused into the curds by the addition of water soluble flavorants and colorants to the soymilk. However, further flavoring and coloring may be desired in connection with a cooked meat analog, particularly for infusing such non-water soluble flavorants and colorants into the curds as herbs and spices. This further flavoring and coloring can be carried out by further cooking the curds in a flavoring mixture, such as a marinade, for a short period of time. Further cooking does not affect the organoleptic properties of the curds, or cause curd aggregation, as the curd protein is fully set at this point, but it simply infuses the curds with the desired flavorants. Alternatively, the curds separated from the whey can be vacuum tumbled in a marinade to infuse color and flavor into the beads of curd. Normally, the infusion of flavor and colorant, if needed, into the curds, by either further cooking, or vacuum tumbling, is carried out subsequent to cooling the curds in tap water.

At this point, depending upon the end product desired and particular process parameters used, the pieces of curd are either a ready-to-eat product, requiring only warming for product satisfaction, or can be further processed. For instance, the pieces of curd can be used, as is, in a simulated ground meat containing product such as chili. The process parameters are controlled to prepare small beads of curd having as indicated above, an average particle diameter of about 1/16 inch to about ¼ inch, and a hardness, chewiness, size and shape resembling ground meat. Appropriately colored and flavored, the beads of curd closely resemble cooked, ground hamburger meat. The beads are simply mixed with other ingredients of the chili or analog product, and eaten as is. The only additional process step required, following flavor and color infusion, is to treat the curds for curd preservation. This can be carried out by such processes as refrigerating the curds at about 3° C. (38° F.), freezing the curds, vacuum packing the curds, and canning.

Alternatively, the pieces of curd can be further processed by pressing the pieces into a patty, to simulate a cooked hamburger patty. Forming the patty is carried out in patty press of conventional design. The process parameters, coloring and flavoring used are essentially the same as the process parameters, coloring and flavoring used to prepare a cooked ground meat analog for addition to a product such as chili. However, it is necessary for the formed curds to adhere to each other, similar to ground meat in a patty. This can be accomplished by adding a binding amount of a binder, such as a vegetable gum, to the curds prior to forming the patty. This can be after water rinsing the curds and/or after refrigerating the curds. One suitable vegetable gum is "Manugel GHB" (sodium alginate). "Manugel" is a trademark of the Kelco Co. Alternatively, the curds can be blended with a binding but small amount of hot curds which have not been rinsed and cooled and thus are still sticky. The amount of hot curds used is not critical. A critical aspect of the present invention is preparing a formed patty which has differentiated curds, similar to the differentiated ground meat in a hamburger patty. The amount of hot curds should be sufficient to obtain patty adhesion but less than that which causes a loss of curd differentiation. A volume percent in the range of about 15% to 50%, based on the volume of cooled curds, typically is used. A preferred range is about 15%-20%. Following formation of the patty, the patty can then be refrigerated, at about 3° C. (38° F.), or frozen, as with the ground meat analog.

Another ready-to-eat product within the scope of the present invention is a scrambled egg analog. In the preparation of this analog, no further steps, other than refrigeration, freezing, vacuum packing, canning, or other preservation step, are required following rinsing. The process parameters are varied, as indicated above, to produce irregular curds having a larger particle size than a ground meat analog, for instance about 1–2 inches average particle diameter. However, the cooking and rinsing steps are carried out so that the curds are still small and distinct non-sticky pieces as in a scrambled egg, in contrast to a pressed tofu product in which the curds lose their identity. Advantageously, by cooking the curds for a shorter period of time, e.g., 0.5 minutes, the curds are less hard than the smaller curds cooked for a longer period of time. More specifically, the curds have organoleptic properties, e.g., hardness and springiness, more closely resembling cooked scrambled eggs, which is much softer than cooked ground meat.

The following Examples 1 and 2 illustrate the preparation of a ground meat analog in accordance with the present invention. Example 3 illustrates the preparation of a scrambled egg analog. In the following Examples, each of the products was tested for organoleptic properties on an Instrom Universal Testing Machine. Three properties were selected as best illustrating the meat analog of the present invention, hardness (in kg) of the curd, springiness (in mm), and chewiness. The properties obtained to illustrate the scrambled egg analog were hardness (in kg), brittleness (in kg), cohesivenes, springiness (in mm), and gumminess (in kg). These properties are described in the text "Food Texture and Viscosity: Concept and Measurement", by Malcolm C. Bourne, Academic Press, 1982, pages 114–117. These pages of this text are incorporated herein by reference. Comparative tests and analyses were also carried out on pieces of a Mcdonald's hamburger, a Mcdonald's scrambled egg, pieces of egg of a McDonald's Egg McMuffin, and pieces of a conventional tofu cake. The tofu cake was made following the procedures set forth in Chapter 5, page 115 of "Tofu and Soymilk Production", William Shurtleff and Akiko Aoyagi, published by New-Age Foods Study Center, copyright 1979, incorporated by reference herein. The results of the tests are given in the Table 1 at the end of the Examples 1 and 2, and in Table 2, at the end of Example 3. In accordance with standard meat analysis procedures, all samples were tested at room temperature. Frozen pieces were thawed prior to testing.

In the following Tables, the first value given for each Example is a mean value obtained for a plurality of samples. The second value given is the standard deviation which was obtained.

EXAMPLE 1

This Example illustrates the preparation of a cooked ground meat analog, such as would be used in a meat patty, or in a food such as chili. Twenty-five pounds of soybeans were soaked for 8 hours in water at 27° C. (80° F.). The beans were then ground with 28 gallons of water. The resulting slurry was heated to 100° C. (212° F.) in a steam injected cooker and the soymilk was extracted. To 14 gallons of the soymilk thus obtained, 0.100 lb of Caramel Color 602 (D. D. Williamson & Co., Inc.) was added. After addition of color, 0.280 lb anhydrous $CaSO_4$ suspended in one half gallon water was added to coagulate the soymilk. Coagulation was carried out in a steam jacketed curding vessel having a single motion mixer. The temperature of the soymilk at the time of $CaSO_4$ addition was 71° C. (160° F.). After one minute the tofu curds were broken up by stirring using the mixer. The mixture of curds and whey was cooked (boiled) in the curding vessel, for ten (10) minutes. Agitation was continued during cooking. The curds were rapidly rinsed and drained in a colander for 15 minutes at room temperature. The curds had a size, in their largest dimension, of about 1/16-¼ inch.

EXAMPLE 2

This Example illustrates the preparation of a cooked, ground meat analog, similar to the analog of Example 1, but frozen. Whereas all of the end products of the present invention can be frozen, it has been found that freezing may be advantageously employed with a ground meat analog or patty. This is because freezing causes the curds to become even meatier, or more sponge-like. This is due to the water in the curds turning to ice with the proteins and other solids forming a lacy network around the ice crystals. This permanently alters the physical characteristics of the product, making a harder product. Twenty-five pounds of soybeans were soaked for 8 hours in water at 27° C. (80° F.). The beans were then ground with 28 gallons of water. The resulting slurry was heated to 100° C. (212° F.) as in Example 1 and the soymilk was extracted. When the soymilk had cooled to 71° C. (160° F.), a suspension of 0.140 lb glucono delta-lactone in one gallon of cold water was added to 13 gallons of the soymilk. An additional 0.144 lb of glucono delta-lactone powder was added to the soymilk, forming tofu curds. The coagulation was carried out in a steam jacketed curding vessel having a single motion mixer. The curds were broken by stirring after one minute. The mixture of curds and whey was boiled for ten minutes, in the curding vessel. The curds were then rinsed and cooled as in Example 1, and frozen.

TABLE 1

| Sample | Hardness kg | Springiness mm | Chewiness |
| --- | --- | --- | --- |
| Example 1 | 35.667 | 9.000 | 190.674 |

TABLE 1-continued

| Sample | Hardness kg | Springiness mm | Chewiness |
| --- | --- | --- | --- |
|  | 1.155 | 7.810 | — |
| Example 2 | 42.800 | 4.000 | 118.984 |
|  | 6.760 | — | — |
| Mcdonald | 43.000 | 3.000 | 84.336 |
| Hamburger | 5.798 | — | — |
| Tofu | 4.650 | 2.000 | 5.162 |

The data of Table 1 shows that the analog of the present invention more closely resembled cooked hamburger meat, particularly with respect to hardness, than did tofu.

EXAMPLE 3

This Example illustrates the preparation of a scrambled egg analog. Twenty-five pounds of soybeans were soaked for 8 hours in water at 27° C. (80° F.). The beans were then ground with 28 gallons of water. The resulting slurry was heated to 100° C. (212° F.) in a pressure cooker and the soymilk was extracted. Fourteen gallons of the soymilk were colored by addition of 0.050 lb of turmeric powder. Then 0.285 lb anhydrous $CaSO_4$ dispersed in one-half gallon of cold water wa added to the soymilk to coagulate the soymilk. After three minutes the tofu curds were broken by stirring. The mixture of the curds and whey was brought to a full boil, then immediately cooled with tap water, so that the cooking time was about 0.5 minutes, and drained. A first batch, batch 1, after cooling, was refrigerated. A second batch, batch 2, after cooling, was frozen. The test results are given in the following Table 2. The curds had a particle size in the curd largest dimension of about one to two inches. The curds were tested as in Examples 1 and 2, and compared with pieces of a McDonald's scrambled egg, and egg pieces of a McDonald's Egg McMuffin.

TABLE 2

| Sample | Hardness kg | Brittleness kg | Cohesiveness | Springiness mm | Gumminess kg |
| --- | --- | --- | --- | --- | --- |
| Example 3 | 3.033 | 2.467 | 0.688 | 9.667 | 2.084 |
| Batch #1 | 0.208 | 0.275 | 0.023 | 0.577 | 0.098 |
| Example 3 | 4.367 | 3.633 | 0.583 | 11.33 | 2.555 |
| Batch #2 | 0.635 | 0.666 | 0.029 | 0.577 | 0.493 |
| McDonald's Scrambled Egg | 1.493 | 1.164 | 0.818 | 7.571 | 1.224 |
|  | 8.485 | 0.372 | 0.053 | 0.976 | 0.370 |
| McDonald's Egg McMuffin | 4.600 | 3.875 | 0.641 | 9.000 | 2.935 |
|  | 0.566 | 0.460 | 0.037 | 0.000 | 0.191 |

From the above Tables, it will be apparent that analog products are obtained, by the present invention, having organoleptic properties which more closely resemble cooked food products, such as a hamburger piece or scrambled egg piece, than does tofu. In Table 1, average data was obtained for the products of the present invention, either frozen or unfrozen, closer to a cooked ground meat piece, than tofu. In each of the characteristics measured in Table 2, the scrambled egg analog, either frozen or unfrozen, gave values closely resembling those of a McDonald's scrambled egg or Egg McMuffin.

Advantages of the present invention should be apparent. Primarily, the process of the present invention provides a cost effective method for producing a cooked food analog, using a minimum number of process steps. A variety of food analog products which have organoleptic properties closely resembling those of the products simulated by the analog products, can be obtained. By varying relatively few parameters of the process, a wide range of organoleptic properties can be obtained, for instance ranging from those of a soft, relatively large curd resembling a scrambled egg, to those of a harder relatively small curd resembling cooked ground meat. The same procedures and apparatus can in essence be employed for all products, reducing production costs. In addition, economies of production are achieved, in the present invention, by the elimination of steps normally required for making conventional tofu products.

From the above description of the invention, those skilled in the art will perceive improvements, changes and modifications. Such improvements, changes and modifications within the skill of the art are intended to be covered by the appended claims.

Having described the invention, the following is claimed:

1. A process for producing a cooked food analog from soybeans comprising the steps of:
   (a) obtaining a soybean milk;
   (b) adding a coagulant to the soybean milk to form a mixture of curds and whey;
   (c) breaking the mixture of curds and whey to obtain curd differentiation;
   (d) cooking the formed curds, while maintaining said curd differentiation, at a temperature and for a time effective to harden the curds and form small pieces of curd;
   (e) separating the curds from the supernatant liquid; and
   (f) rapidly cooling the curds.

2. The process of claim 1 wherein said cooking is carried out with the curds in the whey.

3. The process o claim 2 wherein said cooking is carried out at a temperature of at least 100° C.

4. The process of claim 3 wherein the soybean milk is at a temperature in the range of about 70°-90° C. when the coagulant is added to the soybean milk.

5. The process of claim 4 wherein the cooking is carried out with agitation to form small beads of curd.

6. The process of claim 5 wherein the curds are a meat analog and following cooling are flavored in a marinade.

7. The process of claim 6 wherein said flavoring is carried out by vacuum tumbling.

8. The process of claim 7 wherein said curds are pressed into the form of a patty.

9. The process of claim 4 wherein the cooking is carried out without agitation to form relatively large pieces of curd.

10. The process of claim 1 wherein said cooling is carried out by rinsing the curds in cold water.

11. A process for producing a cooked food analog from soybean comprising the steps of:
   (a) obtaining a soybean milk;
   (b) adding a coagulant to the soybean milk while the soybean milk is at a temperature in the range of about 70°-90° C. to form a mixture of curds and whey;
   (c) breaking the mixture of curds and whey to obtain curd differentiation;
   (d) cooking the formed curds while in the whey, and while maintaining said curd differentiation, at a temperature of at least 100° C. and for a time in the range of about 0.5 to about 15 minutes to harden the curds and form small pieces of curd;
   (e) separating the curds from the whey; and
   (f) rapidly cooling the curds.

12. The process of claim 11 wherein the cooling is carried out with agitation and for a time in the range of about 8 to about 15 minutes effective to form small beads of curds having a hardness of about 25–60 kg as determined on an Instrom Universal Testing Machine, said curds being a meat analog.

13. A process for producing a cooked food analog in the form of a patty resembling a cooked ground meat patty, from soybeans, comprising the steps of:
   (a) obtaining a soybean milk;
   (b) adding a coagulant to the soybean milk to form a mixture of curds and whey;
   (c) breaking the mixture of curds and whey to obtain curd differentiation;
   (d) cooking the formed curds, while maintaining said curd differentiation, at a temperature and for a time effective to harden the curds and form small pieces of curd;
   (e) separating the curds from the supernatant liquid;
   (f) rapidly cooling the curds, said curds having a hardness of about 25–60 kg as determined on an Instrom Universal Testing Machine;
   (g) mixing said curds with a binder; and
   (h) forming said curds into a patty.

14. The process of claim 7 wherein said curds have a hardness of about 25–60 kg as determined on an Instrom Universal Testing Machine.

15. The process of claim 1 wherein a colorant is added to the soybean milk prior to cooking.

16. The process of claim 1 wherein said curds are frozen.

17. The process of claim 11 wherein the cooking is carried out without agitation for a time less than about one minute effective to form relatively large pieces of curd having a hardness of about 1.5 to about 6 kg as determined on an Instrom Universal Testing Machine.

18. The process of claim 17 including the step of adding water soluble colorants and/or flavorants to the soybean milk prior to cooking.

19. The process of claim 13 wherein said binder comprises hot pieces of uncooled curds.

20. The process of claim 19 comprising the use of about 15%–20% uncooled curds.

* * * * *